United States Patent [19]

Yoshizawa et al.

[11] Patent Number: 5,355,273
[45] Date of Patent: Oct. 11, 1994

[54] AUXILIARY POWER UNIT FOR USE WITH A MOTOR VEHICLE

[75] Inventors: Nobuyuki Yoshizawa; Noriyuki Suzuki; Kunio Kato, all of Aichi, Japan

[73] Assignee: Kabushiki Kaisha Tokai Rika Denki Seisakusho, Aichi, Japan

[21] Appl. No.: 981,299

[22] Filed: Nov. 25, 1992

[30] Foreign Application Priority Data

Nov. 26, 1991 [JP] Japan .......................... 3-104711[U]

[51] Int. Cl.⁵ ............................................. H02H 3/00
[52] U.S. Cl. ...................................... 361/93; 361/105
[58] Field of Search .................... 361/93, 24, 25, 26, 361/103, 105; 307/18, 38; 439/639, 654

[56] References Cited

U.S. PATENT DOCUMENTS

| | | | |
|---|---|---|---|
| 4,131,868 | 12/1978 | Dombrowski et al. | 337/113 |
| 4,763,365 | 8/1988 | Gerondale et al. | 361/45 |
| 5,007,863 | 4/1991 | Xuan | 439/639 |

Primary Examiner—A. D. Pellinen
Assistant Examiner—Sally C. Medley
Attorney, Agent, or Firm—Finnegan, Henderson, Farabow, Garrett & Dunner

[57] ABSTRACT

In an auxiliary power unit for a vehicle which comprises a plug to be connected to a cigarette lighter socket provided on the vehicle, and sockets electrically connected to the plug to provide power sources for electrical devices on the vehicle. An overcurrent protective switch is turned off to interrupt the path of current to the sockets when overcurrent flows through the sockets, and a thermally operated member provided for each socket detects the temperature of the socket. When the temperature thus detected exceeds a predetermined upper limit value, the thermally operated member shunts the path of current from the socket, thereby to cause the overcurrent protective switch to operate.

5 Claims, 4 Drawing Sheets

5,355,273

AUXILIARY POWER UNIT FOR USE WITH A MOTOR VEHICLE

BACKGROUND OF THE INVENTION

Field of the Invention

The present invention relates to an auxiliary power unit for use with a motor vehicle which provides power sources for one or more electrical devices using a cigarette lighter socket mounted on the vehicle.

Recently, electrical devices such as portable television sets and compact disk (CD) players have been frequently used in motor vehicles. Power for operating these electrical devices is, typically, obtained through a cigarette lighter socket mounted in a dash board of the motor vehicle. However, because motor vehicles generally have only one cigarette lighter socket, an auxiliary power unit must be employed to provide power for operating more than one such electrical device.

Generally, such an auxiliary power unit comprises a plug which connects to the cigarette lighter socket, and a plurality of branch sockets electrically connected to the plug. Further, current fuses and temperature fuses are typically provided at each of the branch sockets to prevent the flow of excess current to the sockets and to prevent the sockets from reaching extreme temperatures.

The auxiliary power unit thus constructed, however, suffers from various drawbacks. For instance, when one or more of the current fuses or temperature fuses blows, it must be replaced, thereby requiring maintenance by either the motor vehicle operator or service personnel. Further, because a plurality of electrical devices are often connected to the auxiliary power unit, the total interrupting capacities of the current fuses is relatively large. Hence, the main fuse connected between the auxiliary power unit and the vehicle battery may blow before the current fuses blow. In such a case, maintenance of the blown fuse(s) is even more troublesome.

SUMMARY OF THE INVENTION

Accordingly, it is an object of the present invention to provide an auxiliary power unit for use with a motor vehicle which provides protection against excess currents and abnormal temperature rises, and is easy to maintain.

To achieve the foregoing object, and in accordance with the purposes of the invention as embodied and broadly described here, an auxiliary power unit for use with a motor vehicle having a cigarette lighter socket is provided, the auxiliary power unit comprising a plug adapted to be electrically connected to the cigarette lighter socket; at least one socket adapted to be electrically connected to at least one electrical device; and electrical path forming circuit for forming an electrical path between the plug and the at least one socket, the electrical path enabling a flow of current from the plug to the at least one socket, the electrical path forming circuit including a current detecting circuit for detecting the flow of current to the at least one socket, and for opening the electrical path when the detected flow of current exceeds a predetermined current value, thereby stopping the flow of current to the at least one socket, and a temperature detecting circuit for detecting a temperature of the at least one socket, and for short circuiting the electrical path when the detected temperature exceeds a predetermined temperature value, thereby causing the flow of current to the at least one socket to exceed the predetermined current value and causing the current detecting circuit to open the electrical path to stop the flow of current to the at least one socket.

Accordingly, in the auxiliary power unit of the present invention, when current flowing through the sockets exceeds a predetermined current value, an overcurrent protective switch is turned off to cease the flow of current to the sockets. And, when the temperature of the sockets exceeds a predetermined temperature value, a thermally operated member short-circuits the path of current to the sockets, thereby increasing the current flowing through the sockets beyond the predetermined current value and causing the overcurrent protective switch to be turned off and cease the flow of current to the socket.

The accompanying drawings, which are incorporated in and constitute a part of the specification, illustrate a presently preferred embodiment and method of the invention and, together with the general description given above and the detailed description of the preferred embodiment and method given below, serve to explain the principles of the invention.

DETAILED DESCRIPTION OF THE PREFERRED EMBODIMENTS

Figure 4:
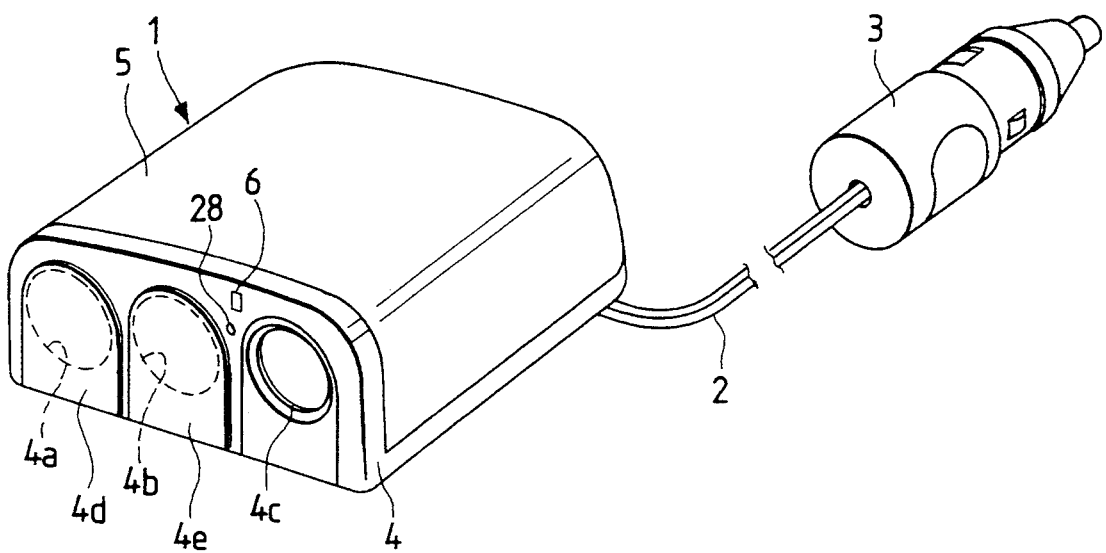
FIG. 4 is a perspective view of the entire auxiliary power unit of FIG. 1.
Figure 6:
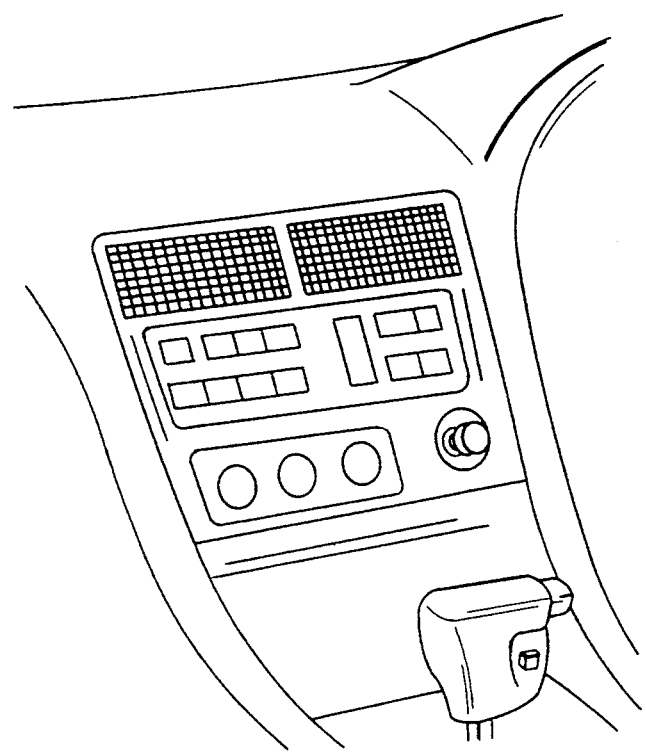
FIG. 6 is a perspective view of the auxiliary power unit of FIG. 1 installed in a cigarette lighter socket mounted in a dash board of a motor vehicle.

FIG. 4 illustrates an auxiliary power unit for use with a motor vehicle, which constitutes one embodiment of the present invention. As shown in FIG. 4, the auxiliary power unit comprises a casing 1, a coupling plug 3, and a power cord 2 extending through casing 1 and connected to coupling plug 3. It should be appreciated that, when coupling plug 3 is connected to a cigarette lighter socket (not shown) of a motor vehicle, power cord 2 is connected, via a main fuse of the motor vehicle (not shown) to the terminals of the motor vehicle battery (not shown).

As further shown in FIG. 4, casing 1 includes a base 4 having a front wall in which three openings 4a, 4b and 4c are formed side by side, and a cover 5. Openings 4a and 4b are provided with removable lids 4d and 4e, respectively. A light emitting diode 6 and a reset button 28 are provided on the front wall of the base 4, to indicate whether or not the auxiliary power unit is operating.

Figure 1:
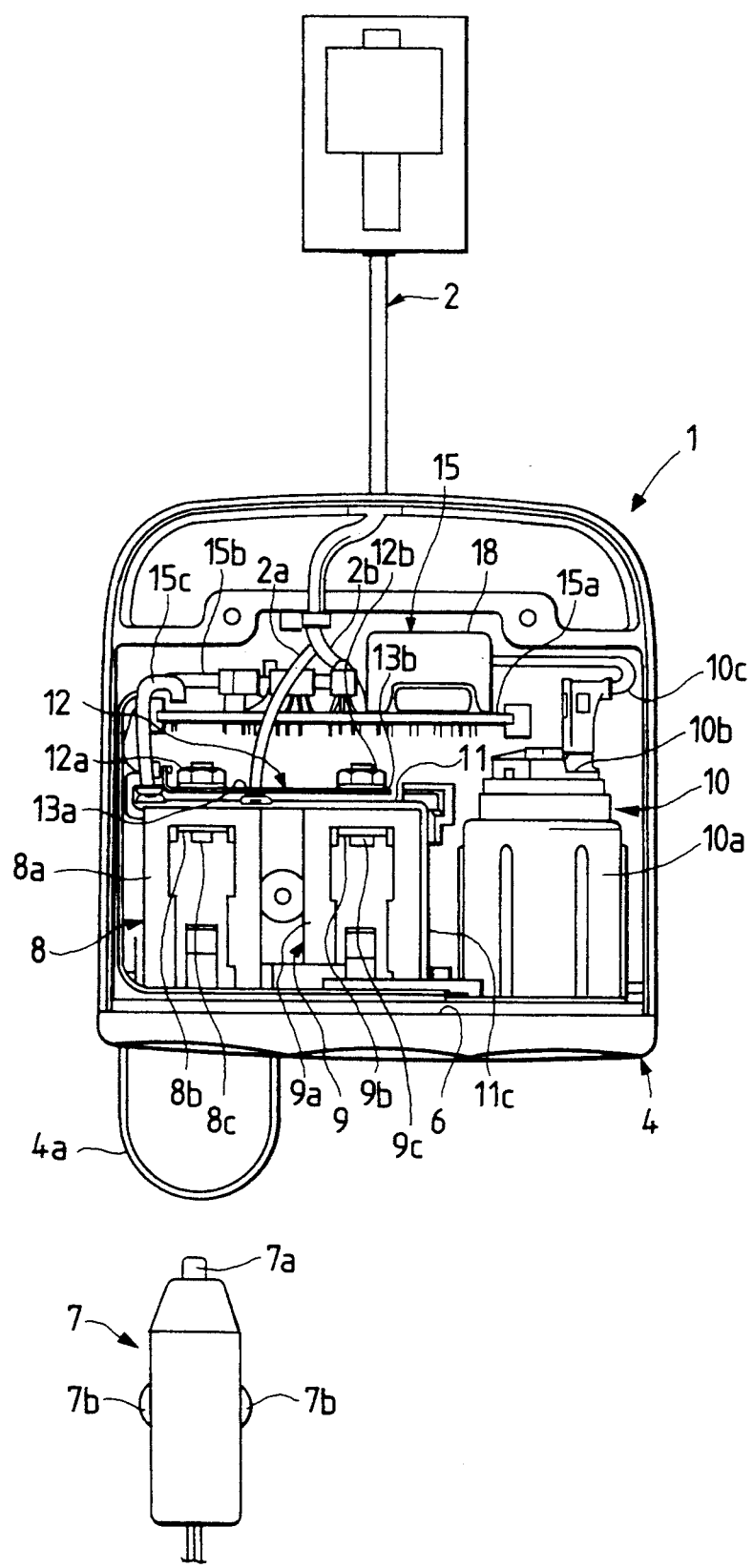
FIG. 1 is a plan view of an auxiliary power unit with its cover removed in accordance with the teachings of one embodiment of the present invention.

As shown in FIG. 1, sockets 8 and 9 are fitted in openings 4a and 4b, respectively, and are adapted to receive a power plug, such as power plug 7, of a portable television or CD player, or the like. Power plug 7 is a conventional plug having a positive electrode 7a and a pair of negative (ground) electrodes 7b. As further shown in FIG. 1, a conventional cigarette lighter socket 10 is fitted in opening 4c.

Figure 2:
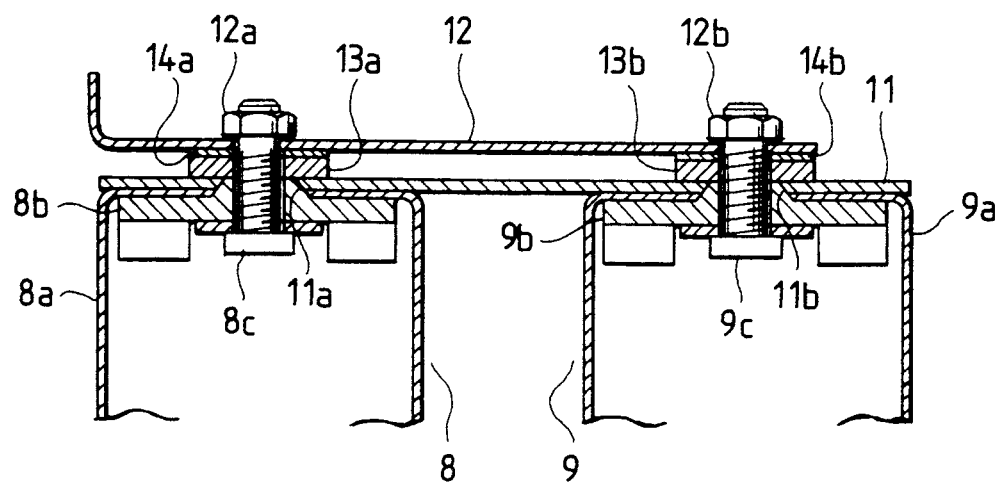
FIG. 2 is an enlarged plan view of various components of the auxiliary power unit of FIG. 1.

As shown in FIG. 2 sockets-8 and 9 include cylindrical socket bodies 8a and 9a, respectively, made of an electrically conductive metal, and terminals 8c and 9c which are secured through insulators 8b and 9b to the bottoms of socket bodies 8a and 9a, respectively.

Socket bodies 8a and 9a are connected to each other via a coupling plate 11, also of an electrically conductive metal, which is laid over the bottoms of socket bodies 8a and 9a. Coupling plate 11 is connected to the negative (ground) line 2a of power cord 2. Insulators 8b and 9b are shaped so as to be fitted in through-holes 11a and 11b, respectively, formed in coupling plate 11, as seen in FIG. 2.

Terminals 8c and 9c have threaded protrusions which are connected to each other through an electrically conductive plate 12. Conductive plate 12 is secured on the threaded protrusions of terminals 8c and 9c by tightening nuts 12a and 12b. Further, washer shaped insulating spacers 13a and 13b are mounted on the threaded protrusions of terminals 8c and 9c, respectively, in such a manner that they are interposed between conductive plate 12 and coupling plate 11.

Figure 3A:
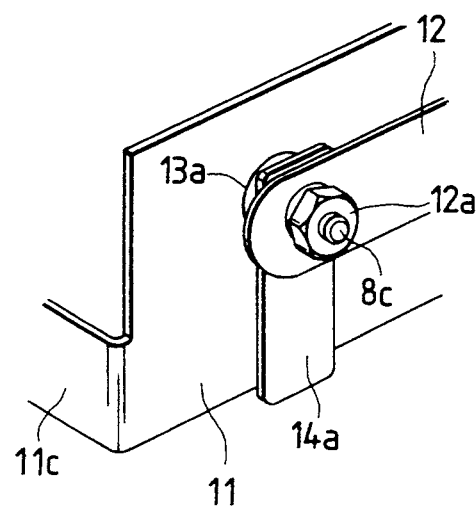
FIGS. 3(a)-3(b) are enlarged perspective views of various components of the auxiliary power unit of FIG. 1.

As shown% in FIG. 3(a), in mounting conductive plate 12 in the above-described manner, thermally operated members, namely, bimetal plates 14a and 14b, are mounted on the threaded protrusions of terminals 8c and 9c, respectively, such that they are interposed between conductive plate 12 and insulating spacers 13a and 13b. Under this condition, nuts 12a and 12b are tightened to secure conductive plate 12 on the protrusions in electrical contact with the bimetal plates 14a and 14b.

As further shown in FIG. 3(a), an arm 11c extends from coupling plate 11. Arm 11c is connected to socket body 10a of cigarette lighter socket 10, which serves as a negative (ground) terminal, and positive terminal 10b of socket 10 is connected to conductive plate 12 through a printed circuit board 15a and a load wire 15b of a circuit unit 15 disposed in casing 1 (FIG. 1).

Figure 3B:
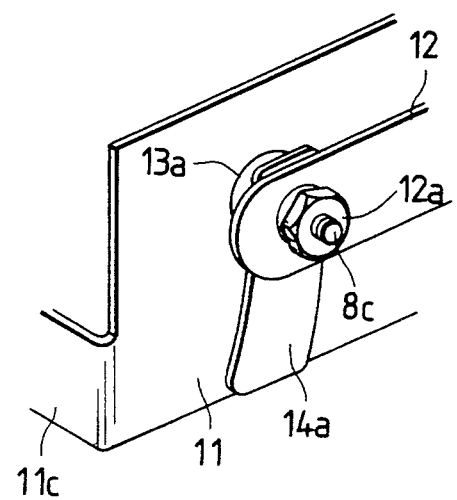

As shown in FIG. 3(b), bimetal plates 14a and 14b deform upon sensing an increase in temperature of socket bodies 8a and 9a such that their end portions contact coupling plate 11 when socket bodies 8a and 9a reach a temperature which is above a predetermined threshold value. Hence, coupling plate 11, conductive plate 12, and bimetal plates 14a and 14b form a parallel circuit including two thermally operated switch elements (indicated by SW1 and SW2 in FIG. 5 which will be described later).

Referring back to FIG. 1, one end of circuit unit 15 is connected directly to positive line 2b of power cord 2, while the other end is connected, via a lead wire 15c and coupling plate 11, to negative (ground) line 2a of power cord 2. Again, circuit unit 15 is also connected through lead wire 15b to conductive plate 12, as was described above.

Figure 5:
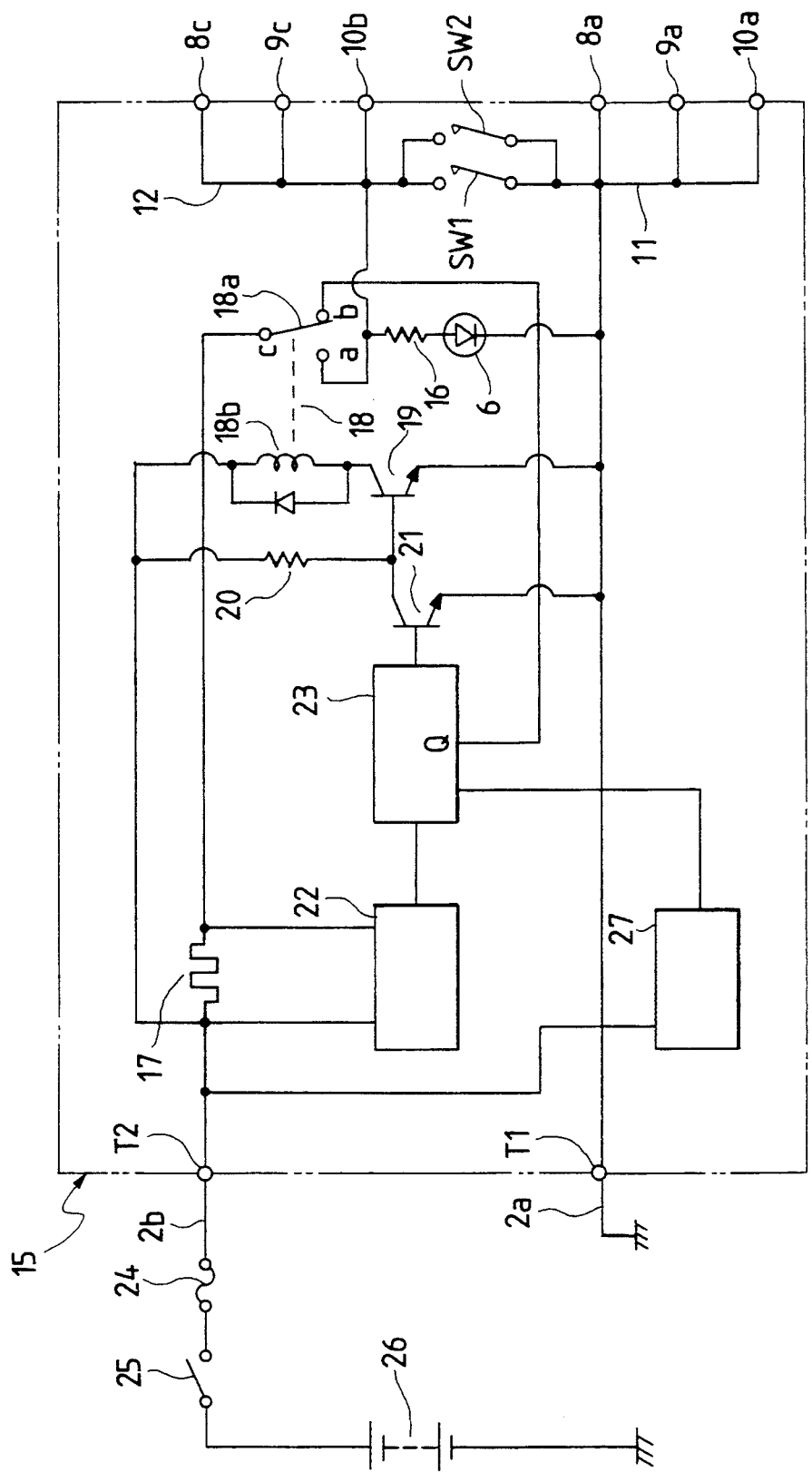
FIG. 5 is a schematic diagram of a circuit unit of the auxiliary power unit of FIG. 1.

FIG. 5 illustrates a schematic diagram of circuit unit 15. As shown in FIG. 5, circuit unit 15 includes two thermally operated switch elements SW1 and SW2 which are formed by coupling plate 11, conductive plate 12 and bimetal plates 14a and 14b, as described above. One terminal of each of switch elements SW1 and SW2 is connected to terminals 8c, 9c and 10b of sockets 8, 9 and 10, while the other terminal of each of switch elements SW1 and SW2 is connected to socket bodies 8a, 9a and 10a. Further, lines 2a and 2b of power cord 2 are connected to terminals T1 and T2, respectively, and terminal T1 is further connected to socket bodies 8a, 9a and 10a.

Circuit unit 15 further comprises a relay 18 including an overcurrent protection switch, namely, a relay switch 18a connected to a relay terminal c, an excitation coil 18b, and an armature (not shown), a normally open contact terminal a which is connected to socket terminals 8c, 9c and 10b, and a normally closed contact terminal b. In its normal position, switch 18a is held to contact terminal b by a return spring (not shown). A load current detecting shunt resistor 17 is connected between terminal T2 and relay terminal c. Light emitting diode 6 is connected, via a current limiting resistor 16, between contact terminal a and terminal T1. One terminal of excitation coil 18b is connected to terminal T2, while the other terminal is connected through the collector and emitter of an npn-type transistor 19 to terminal T1. The base of transistor 19 is connected through a resistor 20 to terminal T2, and through the collector and emitter of an npn-type transistor 21 to terminal T1.

Circuit unit 15 further comprises a current monitoring unit 22, shunted by shunt resistor 17, for detecting a load current flowing through shunt resistor 17 (i.e., current flowing to sockets 8, 9 and/or 10), and for activating a hold circuit 23 upon detecting a load current which exceeds a predetermined value.

Upon being activated by current monitoring unit 22, hold circuit 23 turns on transistor 21 after a predetermined time delay, and keeps transistor 21 turned on as long as a voltage signal is applied to its terminal Q which is connected to normally closed contact terminal b of relay switch 18a.

Line 2b serves to connect terminal T2 through a main fuse 24 and an ACC switch 25 to the positive terminal of a motor vehicle battery 26.

Finally, voltage monitoring unit 27 is connected between terminal T2 and hold circuit 23. Upon detection of voltage decrease of motor vehicle battery 26 (no more than 9V), voltage monitoring unit 27 activates hold circuit 23, such that relay coil 18 is deenergized, and the armature of relay 18 transfers relay switch 18a to contact terminal b through transistors 19 and 21.

Thus, the application of current to sockets 8, 9 and 10 is interrupted, and then it can be prevented from running down of motor vehicle battery 26.

Operation of the foregoing auxiliary power unit will now be described.

When coupling plug 3 is connected to the cigarette lighter socket (not shown) of a motor vehicle and ACC switch 25 is turned on, current is supplied to circuit unit 15 and transistor 19 is thereby rendered conductive (on). As a result, relay coil 18b is energized, such that the armature of relay 18 transfers relay switch 18a from contact terminal b to contact terminal a. That is, contact terminal a and relay terminal c are connected through relay switch 18a, whereby electrically common terminals 8c, 9c and 10b of sockets 8, 9 and 10 are connected through shunt resistor 17 to motor vehicle battery 26. As a result, current is supplied to sockets 8, 9 and 10 for use by electrical devices, e.g., portable televisions, CD players, etc., and a cigarette lighter plugged into these sockets. It should be noted that light emitting diode 6 is turned on, thus indicating that sockets 8, 9 and 10 are connected to motor vehicle battery 26 through relay 18.

While current is being supplied to sockets 8, 9 and 10, current monitoring circuit 22 detects load current flowing through shunt resistor 17, and activates hold circuit 23 when the load current exceeds a predetermined value. Hold circuit 23, thus activated, renders transistor 21 conductive (on) after a predetermined time delay, as was described above. As a result, transistor 19 is rendered non-conductive (off), relay coil 18b is deenergized, and the armature of relay 18 transfers relay switch 18a from contact terminal a to contact terminal b. Thus, the application of current to sockets 8, 9 and 10 is interrupted, while a voltage signal is applied through relay terminal c and contact terminal b to terminal Q of hold circuit 23. As a result, hold circuit 23 maintains transistor 21 conductive (on) and, accordingly, maintains the path of current to sockets 8, 9 and 10 open.

With current supplied to sockets 8, 9 and 10, the electrical devices connected thereto can be operated. While the electrical devices are being operated, however, the temperatures of sockets 8 and 9 may increase. As the temperatures of sockets 8 and 9 increase in this manner, bimetal plates 14a and 14b begin to deform. When the temperatures of sockets 8 and 9 exceed a predetermined upper limit value, the end of at least one of bimetal plates 14a and 14b moves (or deflects) into contact with coupling plate 11, such that the corresponding one of thermally operated switch elements SW1 and SW2 is closed. As a result, sockets 8, 9 and 10 are shunted, and thus shunt resistor 17 is connected directly across motor vehicle battery 26. The resulting overcurrent flowing through shunt resistor 17 is then detected by current monitoring circuit 22.

Upon detection of the overcurrent, current monitoring circuit 22 activates hold circuit 23, such that relay coil 18 is deenergized, and the armature of relay 18 transfers relay switch 18a to contact terminal b, thereby opening the path of current to sockets 8, 9 and 10. That is, the application of current to sockets 8, 9 and 10 is interrupted.

It should be noted that hold circuit 23 can be reset by disconnecting circuit unit 15 from the power source, for instance, by turning off the ACC switch 25 or by disengaging coupling plug 3 from the cigarette lighter socket of the motor vehicle.

In summary, with the above-described embodiment of the present invention, electric sources are provided on the vehicle for use by two electrical devices and one cigarette lighter. When an excessively large load current flows through sockets, or the temperature of the sockets abnormally increases, the path of current to sockets is opened, thereby interrupting the application of current to the sockets. Hence, the auxiliary power unit of the present invention, unlike the conventional one, is free from the troublesome operation of replacing current fuses or temperature fuses and, therefore simpler to maintain. Furthermore, the two thermally operated switch elements, i.e., SW1 and SW2 of the present invention, are formed by using a single coupling plate 11 as their contact element and, therefore, the auxiliary power unit of the present invention has a simplified structure.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. An auxiliary power unit for use with a motor vehicle having a cigarette lighter socket, said auxiliary power unit comprising:
   a plug adapted for electrical connection to said cigarette lighter socket;
   at least one socket adapted for electrical connection to at least one electrical device; and
   electrical path forming means for forming an electrical path between said plug and said at least one socket, said electrical path enabling a flow of current from said plug to said at least one socket, said electrical path forming means including
   first means for detecting said flow of current to said at least one socket and for opening said electrical path when said detected flow of current exceeds a predetermined current value, thereby stopping said flow of current to said at least one socket, and
   second means for detecting a temperature of said at least one socket, and for short circuiting said electrical path when said detected temperature exceeds a predetermined temperature value, thereby causing said flow of current to said at least one socket to exceed said predetermined current value and causing said first means to open said electrical path to stop said flow of current to said at least one socket.

2. The auxiliary power unit of claim 1, wherein said first means includes a voltage monitoring unit.

3. The auxiliary power unit of claim 1, which includes three sockets.

4. The auxiliary power unit of claim 1, wherein said temperature detecting means includes
   an electrically conductive plate coupled to said electrical path;
   a coupling plate coupled to said electrical path; and
   at least one bimetal plate coupled to said electrically conductive plate, said bimetal plate deforming to contact said coupling plate when said detected temperature exceeds said predetermined temperature value, thereby short circuiting said electrical path.

5. The auxiliary power unit of claim 1, wherein said current detecting means opens said electrical path only after a period of time has elapsed since said detected flow of current exceeds said predetermined current value.

* * * * *